(12) United States Patent
Hawkins

(10) Patent No.: US 7,252,123 B1
(45) Date of Patent: Aug. 7, 2007

(54) METHOD, APPARATUS AND SYSTEM FOR FILLING AND USING BAGS FOR GROUT AND SIMILAR MATERIALS

(76) Inventor: Ricky W. Hawkins, 1368 Plum Dr., W., Fernandina Beach, FL (US) 32034

( * ) Notice: Subject to any disclaimer, the term of this patent is extended or adjusted under 35 U.S.C. 154(b) by 86 days.

(21) Appl. No.: 11/176,950

(22) Filed: Jul. 7, 2005

Related U.S. Application Data

(60) Provisional application No. 60/586,628, filed on Jul. 9, 2004.

(51) Int. Cl.
 *B65B 1/04* (2006.01)
(52) U.S. Cl. .................. 141/391; 141/316; 249/99
(58) Field of Classification Search ........ 141/313–316, 141/114, 390, 391; 248/94, 95, 97, 99
See application file for complete search history.

(56) References Cited

U.S. PATENT DOCUMENTS

| | | | | |
|---|---|---|---|---|
| 2,678,764 A | * | 5/1954 | Carlson ..................... | 141/390 |
| 3,679,125 A | * | 7/1972 | Forance et al. ............. | 220/737 |
| 3,762,599 A | * | 10/1973 | Bourgeois .................... | 141/391 |
| 3,818,956 A | * | 6/1974 | Chamberlain ............... | 141/316 |
| 4,248,278 A | * | 2/1981 | Blodgett ..................... | 141/316 |
| 5,170,516 A | * | 12/1992 | Davison ........................ | 4/484 |
| 5,538,050 A | * | 7/1996 | Galdon ........................ | 141/10 |
| 5,918,651 A | * | 7/1999 | Gazdy et al. ............... | 141/391 |
| 5,950,251 A | * | 9/1999 | Cost et al. .................... | 4/483 |

\* cited by examiner

*Primary Examiner*—Steven O. Douglas
(74) *Attorney, Agent, or Firm*—Allen, Dyer, Doppelt, Milbrath & Gilchrist, P.A.

(57) ABSTRACT

A grout bag housing support in the shape of cylinder has an upper open end and a lower open end, with a sidewall having passageways at the lower end through which water may drain during the grout bag filling operation. A securing collar is dimensioned to fit in the upper end of the cylinder in order to hold a grout bag firmly in place while being filled, and to thereafter permit removal of the grout bag upon removal of the securing collar.

13 Claims, 3 Drawing Sheets

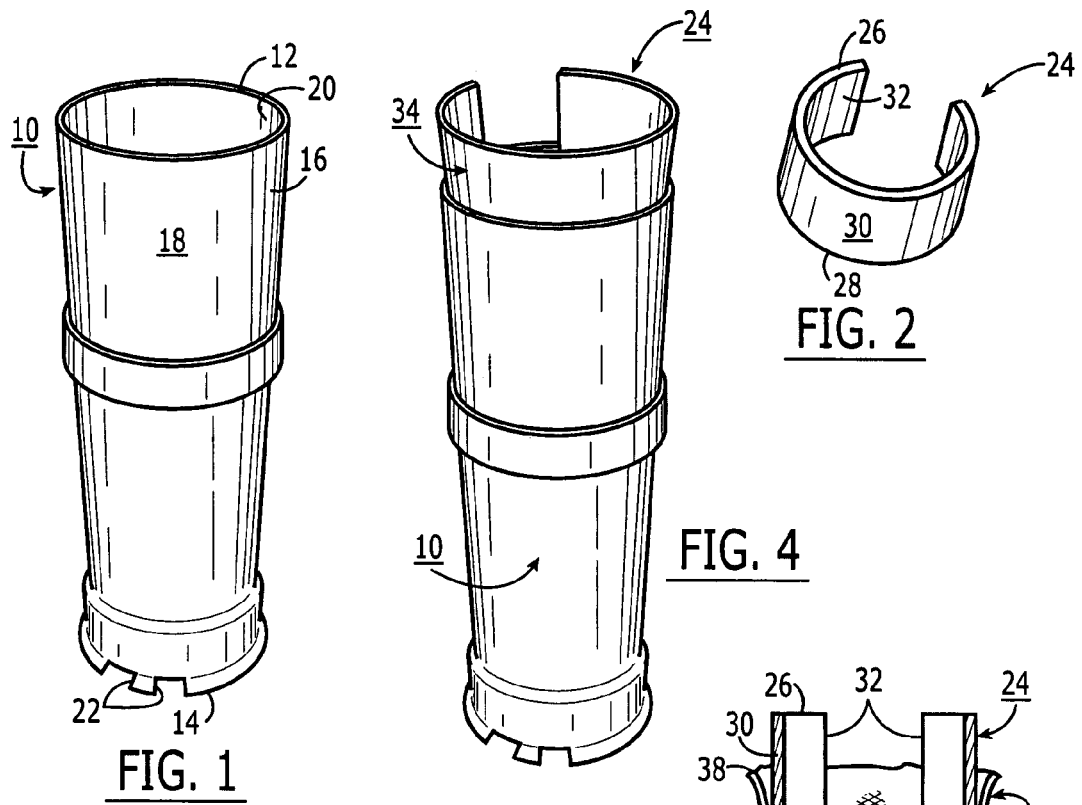
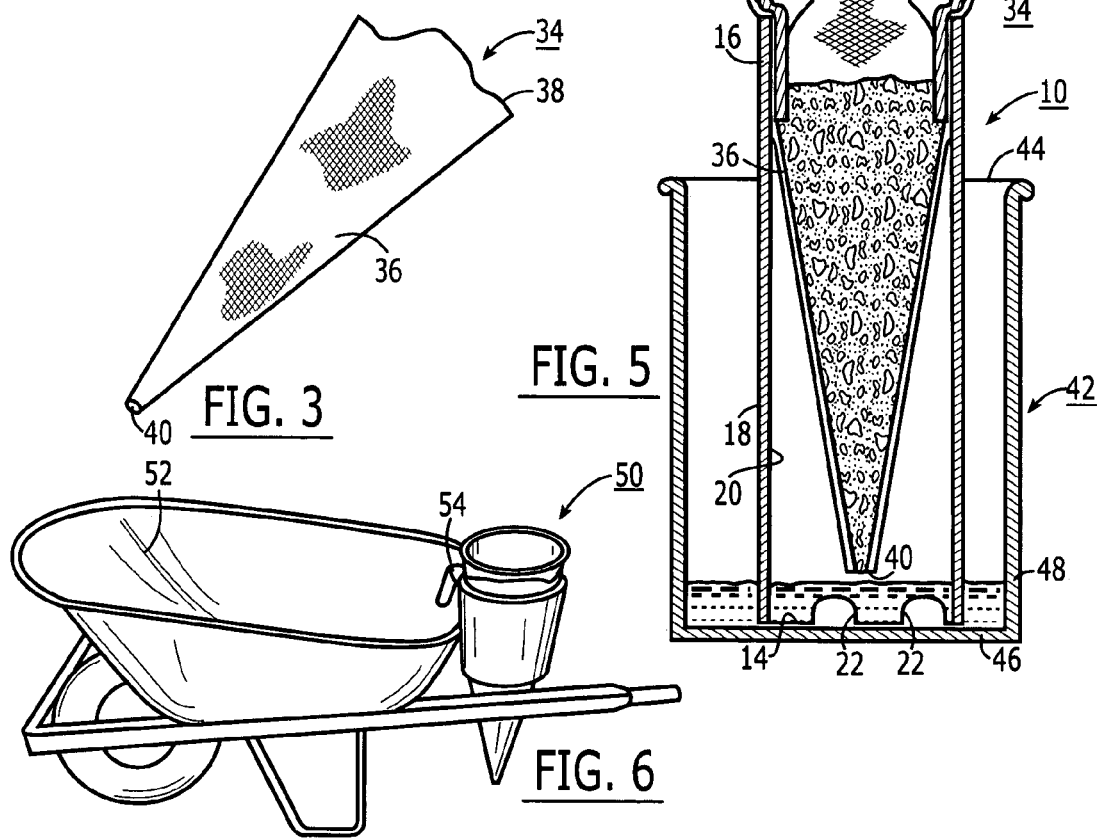

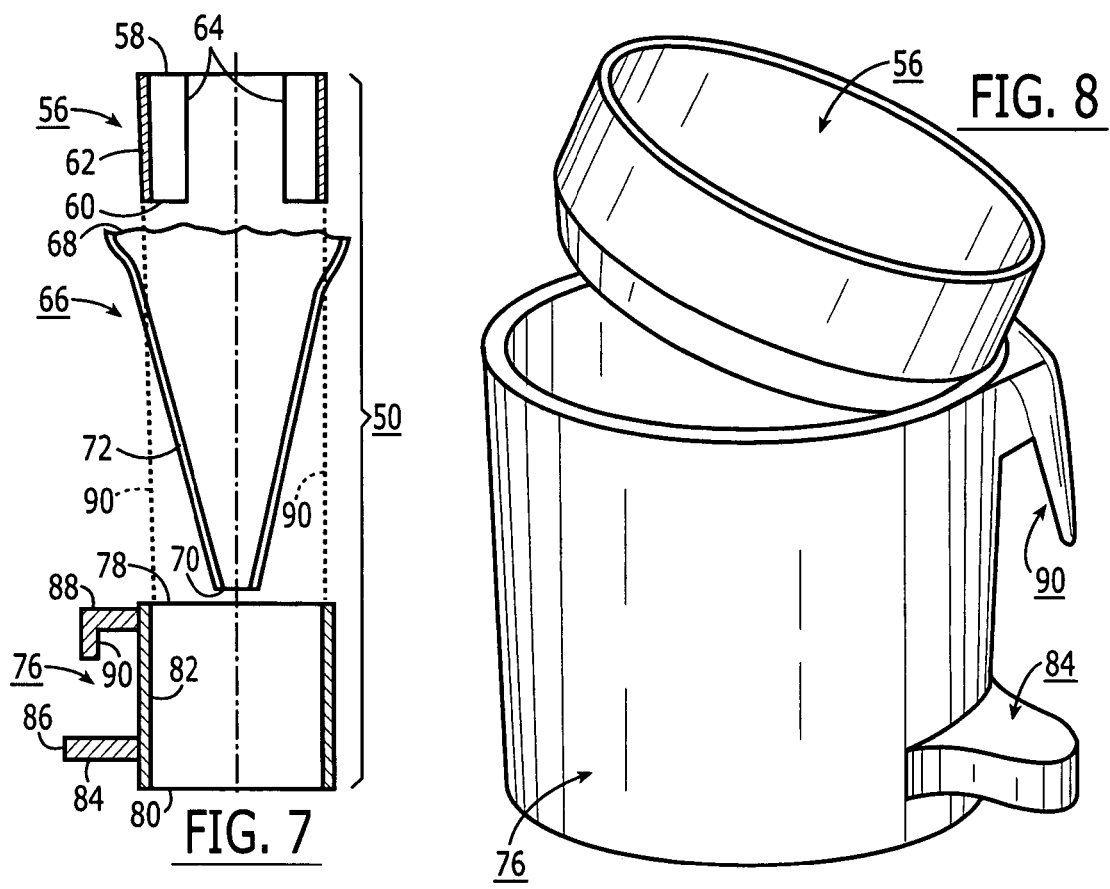
FIG. 8
FIG. 7
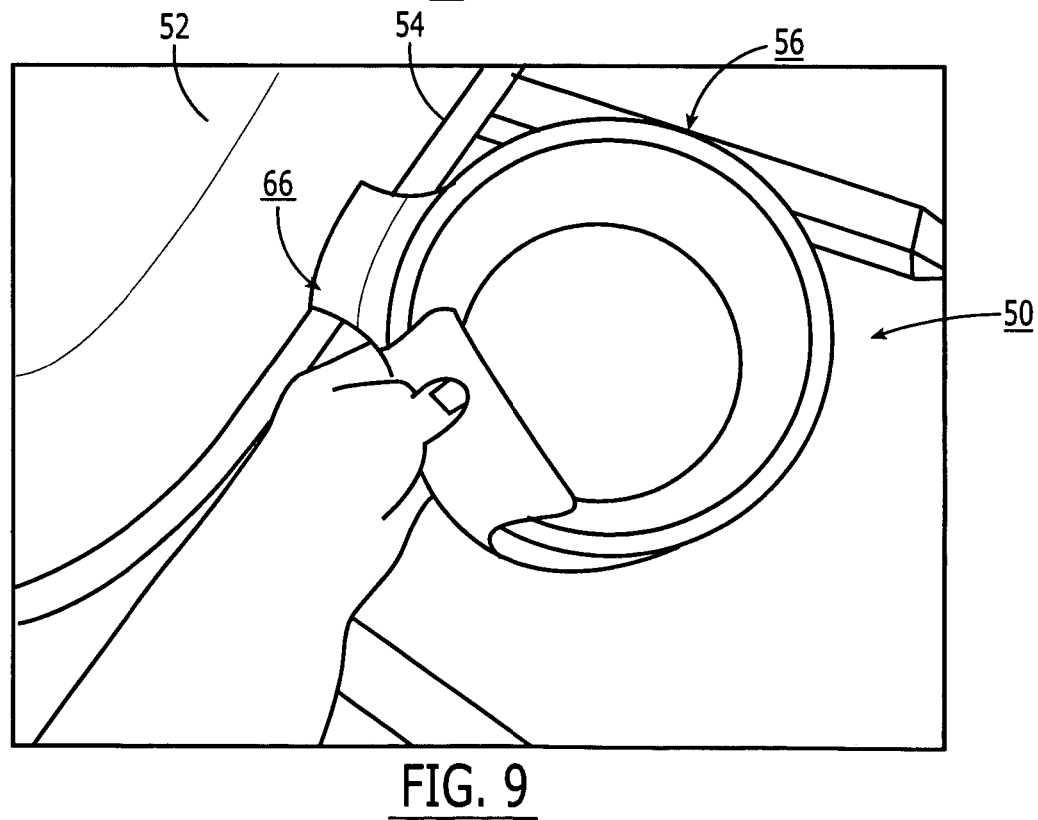
FIG. 9

METHOD, APPARATUS AND SYSTEM FOR FILLING AND USING BAGS FOR GROUT AND SIMILAR MATERIALS

CROSS REFERENCE TO RELATED APPLICATION

This application claims the benefit of U.S. Provisional Application No. 60/586,628 which was filed on Jul. 9, 2004, the disclosure of which is hereby incorporated by reference herein in its entirety.

BACKGROUND

The present invention is directed generally to the construction trades and more specifically to a method, apparatus and system for filling bags for grout and similar materials used in joints on flat work, such as brick and tile flooring as well as where other masonry veneer or facade is being installed.

DESCRIPTION OF THE PRIOR ART

Grout bags have been used in the past by masons and tile setters for placing mortar or grout in the spaces between masonry or tile products on flat work as well as wall coverings such as a stone or tile veneer or facade. The grout is placed into the bag in a wet, amorphous condition which is difficult to fill. Further, during the process of filling the grout bag, it is critical that the outside of the bag stays dry and free from any grout residue. The dampness and/or grout residue on the exterior of the bag renders the bag very difficult to use thus making the grout bag undesirable to the user as well as being difficult to keep the work area clean.

Grout bags presently in use in the masonry trades are made of a flexible vinyl interior material with a cloth mesh exterior material which must be cleaned in order to avoid obstructions in the flow of fresh mortar or grout. This cleaning process usually involves either immersing the bag entirely into a bucket of water, or using a water hose to spray the bag while being held by the worker.

The grout is customarily mixed either in a mixing machine or wheelbarrow. When filling the grout bag in a conventional manner, the bag is held with one hand and is filled using a trowel with the other hand, or one worker holds the bag open with two hands to try to avoid grout from contacting the outside of bag while another worker fills the bag.

SUMMARY OF THE INVENTION

The present invention is directed to two different embodiments of apparatus and an associated system and method which supports a conventional grout bag in a vertical manner without being held by the worker, so that the grout bag can be quickly filled and easily removed from the supporting apparatus while keeping the exterior of bag free from grout residue and moisture.

In a first embodiment, the apparatus comprises a grout bag housing in the shape of a cylinder having an upper open end and a lower open end, with a side wall having passageways at the lower end through which water may drain during the grout bag filling operation. The apparatus further includes a securing collar which, in a preferred form, is a partial cylinder dimensioned to fit into the upper end of the cylinder which forms the grout bag housing. The partial cylinder forming the securing collar has an elongated slot which permits the grout bag to be held firmly in place while the securing collar is being removed following the filling of the bag with grout.

A second embodiment of the apparatus which incorporates the system and method of the present invention is designed to be attached to the side or end of a wheelbarrow and also employs a cylindrical housing and securing collar for retaining the grout bag in place during the filling operation. In this second embodiment, the grout bag housing includes a hook for attachment to the rim of a wheelbarrow or similar receptacle in which the grout is being mixed, and an extension for retaining the housing in a generally vertical orientation.

Other specific details of the present invention will be best understood from a review of the drawing and the detailed description which follows next.

THE DRAWING

FIG. 1 is a perspective view of a grout bag support housing in accordance with a first embodiment of the present invention.

FIG. 2 is a perspective view of a securing collar for the housing of FIG. 1, in accordance with the first embodiment.

FIG. 3 is a perspective view of a conventional grout bag.

FIG. 4 is a perspective view showing the assembly of the housing, securing collar and grout bag of FIGS. 1-3 in accordance with the first embodiment.

FIG. 5 is a cross sectional view of the assembly of the first embodiment.

FIG. 6 is a perspective view of an assembled grout bag support housing, securing collar and grout bag attached to a wheelbarrow in accordance with the present invention.

FIG. 7 is an exploded cross sectional view of the assembly of the second embodiment.

FIG. 8 is a perspective view of the assembly of the second embodiment.

FIG. 9 is a top view of the assembly of the second embodiment.

DETAILED DESCRIPTION

Figure 10:
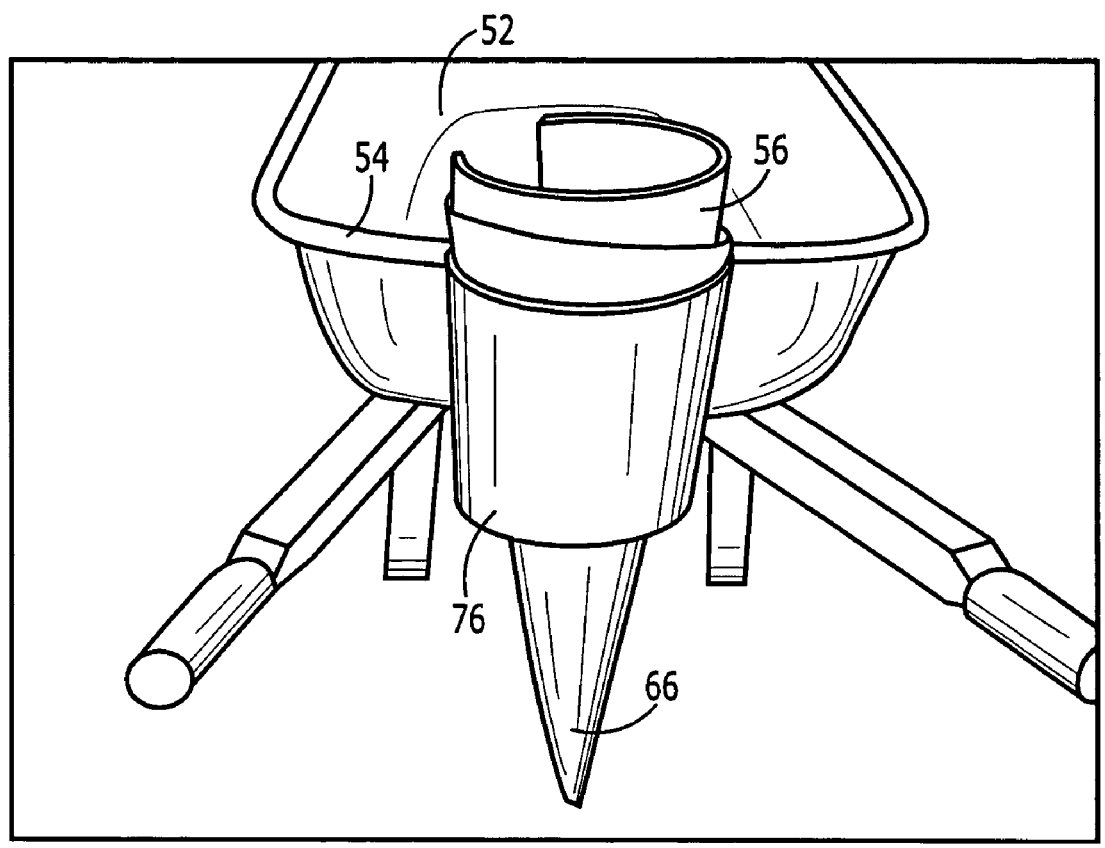
FIG. 10 is a rear view of the assembly of the second embodiment.

Apparatus incorporating the first embodiment of the present invention will now be described with reference to FIGS. 1-5. First noting FIG. 1, a grout bag support housing in the form of a cylinder 10 has an upper open end defining a rim 12 and a lower, open end 14. The cylinder 10 is further defined by a side wall 16 having an outside surface 18 and an inside surface 20. The side wall 16 has one or more passageways 22 at the lower end 14 through which water drains during the grout bag filling process, as denoted in FIG. 5.

As shown in FIG. 2, the first embodiment includes a securing collar formed of at least a partial cylinder 24 having an upper open end 26, a lower open end 28 and a side wall 30. The side wall 30 has an elongated slot 32, which permits the upper end 38 of the grout bag 34 (FIG. 3) to be held in place by the worker while the collar 24 is being removed (note FIGS. 4 and 5).

The assembly of the housing 10, securing collar 24 and grout bag 34 is shown in FIG. 4. It will of course be understood that the outside dimension of the securing collar 24 is designed to fit within the housing 10 and along the inside surface 20 thereof. In use, the grout bag 34 is slipped in an unfilled condition into the housing 10, and the securing collar 24 is placed firmly around the inside of the upper end 38 of the grout bag 34 so that the bag can be firmly held in place during the filling operation. As shown in FIG. 5, the grout bag 34 is then filled, and the worker's hand is placed in the slot 32 to hold the bag firmly against movement while the securing collar 24 is removed. The grout bag is then lifted out of the housing 10, with any residual water being permitted to drip into a bucket 42 through the passageways 22.

The apparatus which forms the second embodiment will now be described with reference to FIGS. 6-10. The second embodiment comprises an assembly 50 shown in an exploded cross sectional view in FIG. 7 and the perspective view of FIG. 8. The assembly 50 includes a securing collar 56, a grout bag 66 and a grout bag support housing 76. As with the securing collar 24 in the first embodiment (FIGS. 1-5), the securing collar 56 has a slot 64 which permits the worker to hold the grout bag 34 in place after the filling operation is completed. As shown by the dotted lines identified with reference numeral 90, the outer dimension of the support collar 56 is such as to fit within the inner diameter of the sidewall 82 of the support housing 76. Of course, various modifications may be made in the support collars 24 and 56 to facilitate removal, including a tapering of the lower portion of the sidewalls 30 or 62 (note FIG. 2).

In accordance with the preferred form of the second embodiment, the support housing 76 is provided with an extension member 84 having an end 86 which is dimensioned to rest against the sidewall of a conventional wheelbarrow, in order to hold the support housing 76 in a generally vertical direction. This preferred form of the second embodiment also includes a hook for engaging the wall 54 or the wheelbarrow 52, the hook including a generally horizontal member 88 and a vertical hook member 90 (FIG. 7).

FIGS. 9 and 10 further illustrate the features of the second embodiment as described above.

It will be appreciated by those skilled in the art that various modifications and improvements may be made to both the first and second embodiments described above, without departing from the spirit and scope of the present invention.

What is claimed is:

1. Apparatus for supporting a grout dispensing bag during filling, the apparatus comprising:
   and elongated grout bag;
   a grout bag support having an open upper end and an open lower end with a dimension between the ends sufficient to permit the elongated grout bag to be removably extended through the support;
   means for receiving the grout bag support for retaining fluids draining from the elongated grout bag and grout bag support;
   means for removably securing an upper open end of the elongated grout bag at the upper end of the support; and wherein
   the grout bag may be filled while secured in the support with the securing means and thereafter the grout bag may be removed for application of the grout through a dispensing end thereof.

2. The apparatus recited in claim 1 wherein the grout bag support at the upper end is generally tubular-shaped with the open upper end dimensioned to receive the open upper end of the grout bag.

3. The apparatus recited in claim 1 wherein the securing means comprises a cylindrical-shaped ring portion having a dimension permitting the ring portion to be swaged about the open upper end of the grout bag support of the open end of the grout bag therebetween.

4. The apparatus recited in claim 3 wherein the ring portion is dimensioned to fit within the inside diameter of the open upper end of the grout bag support.

5. The apparatus recited in claim 1 wherein the grout bag support is defined by a side wall between the upper and lower ends, and further comprising drainage passageways extending through the side wall of the grout bag support at the lower end thereof.

6. The apparatus recited in claim 1 where the means for receiving the grout bag support comprises a drainage bucket dimensioned to receive the open lower end of the grout bag support.

7. The apparatus recited in claim 1 further comprising hook means fitted to a outside surface of the grout bag support for attaching the apparatus to the sidewall of a wheel barrow.

8. The apparatus recited in claim 7 further comprising an extension member dimensioned to rest against the sidewall of the wheelbarrow in order to maintain the grout bag support in a generally vertical position when attached to a wheelbarrow by the hook means.

9. A method for supporting a grout dispensing bag during filling, the method comprising the steps of:
   providing an elongated grout bag
   providing a grout bag support having an open upper end and an open lower end with a dimension between the ends sufficient to permit the elongated grout bag to be removably extended through the support;
   providing a means for receiving the grout bag support for retaining fluids draining from the elongated grout bag and grout bag support; and
   removably securing an upper open end of the elongated grout bag at the upper open end of the support; and thereafter
   filling the grout bag while secured in the support, and thereafter removing the grout bag from the grout bag support in order to dispense grout through a dispensing opening in the lower end thereof.

10. The method recited in claim 9 further comprising the step of forming the grout bag in a generally tapered configuration with the smallest dimension at the lower dispensing end.

11. The method recited in claim 10 wherein the support between the upper and lower open ends is defined by a sidewall, and further comprising the step of extending drainage passageways through the sidewall of the grout bag support at the lower open end.

12. The apparatus recited in claim 5 where the means for receiving the grout bag support comprises a drainage container dimensioned to receive the open lower end of the grout bag support.

13. In combination:
   a wheelbarrow having a sidewall;
   an elongated grout bag having an upper open end and tapering to a lower, open end with the dimension at the lower end being smallest relative to the upper open end;
   a grout bag support having an upper open end and an open lower end with a dimension between the ends sufficient to permit the elongated grout bag to be removably extended through the support and secured with the support at the upper end during filling;

means for attaching the grout bag support to the sidewall of the wheelbarrow;

an extension member extending from the grout bag support and dimensioned to rest against the sidewall of the wheelbarrow in order to maintain the grout bag support in a generally vertical position when attached to the wheelbarrow; and wherein after filling, the grout bag may be easily removed for application of grout through the lower open end.

* * * * *